(12) United States Patent
Gsell et al.

(10) Patent No.: US 7,927,464 B2
(45) Date of Patent: Apr. 19, 2011

(54) VAPOR COMPRESSION DISTILLATION SYSTEM INCLUDING AN INTEGRATED MOTOR/COMPRESSOR UNIT

(75) Inventors: George V. Gsell, Houston, TX (US); Kim C. Klein, Ponchatoula, LA (US)

(73) Assignee: Mechanical Equipment Company, Inc., Sugar Land, TX (US)

( * ) Notice: Subject to any disclaimer, the term of this patent is extended or adjusted under 35 U.S.C. 154(b) by 937 days.

(21) Appl. No.: 11/880,807

(22) Filed: Jul. 24, 2007

(65) Prior Publication Data

US 2009/0026061 A1    Jan. 29, 2009

(51) Int. Cl.
*B01D 1/28* (2006.01)
*B01D 3/02* (2006.01)

(52) U.S. Cl. ........... 202/176; 62/498; 62/508; 159/24.1; 159/24.2; 159/26.1; 202/182; 202/202; 203/24; 203/26

(58) Field of Classification Search ............... 159/24.1, 159/24.2, 26.1; 202/176, 182, 202, 235; 203/24, 26, DIG. 8; 62/498, 508
See application file for complete search history.

(56) References Cited

U.S. PATENT DOCUMENTS

| | | | | |
|---|---|---|---|---|
| 2,446,880 A | * | 8/1948 | Kleinschmidt | 202/187 |
| 4,282,067 A | * | 8/1981 | Katz et al. | 202/180 |
| 4,342,624 A | * | 8/1982 | Chute et al. | 202/176 |
| 4,361,015 A | * | 11/1982 | Apte | 62/238.4 |
| 7,597,784 B2 | * | 10/2009 | Bednarek et al. | 203/1 |
| 7,633,193 B2 | * | 12/2009 | Masoudipour et al. | 310/54 |

* cited by examiner

*Primary Examiner* — Virginia Manoharan
(74) *Attorney, Agent, or Firm* — Wood, Phillips, Katz, Clark & Mortimer

(57) ABSTRACT

A vapor compression distillation system (10) is provided and includes a fluid inlet (12) for receiving a fluid, a fluid outlet (14) for a distillate that has been distilled from the fluid, a heat exchanger (16) connected to the fluid inlet (12) and the fluid outlet (14) to transfer heat from the distillate to the fluid; and an integrated motor/compressor unit (18) connected to the heat exchanger (16) to receive vaporized distillate therefrom and to supply pressurized distillate thereto. The system 10 may further include a coolant system (20) connected to the integrated motor/compressor (18) to supply a coolant flow thereto. The system (10) may also include an air oil mist system (22) that is connected to the integrated motor/compressor unit (18) to supply an air oil mist thereto for bearing lubrication and cooling.

20 Claims, 1 Drawing Sheet

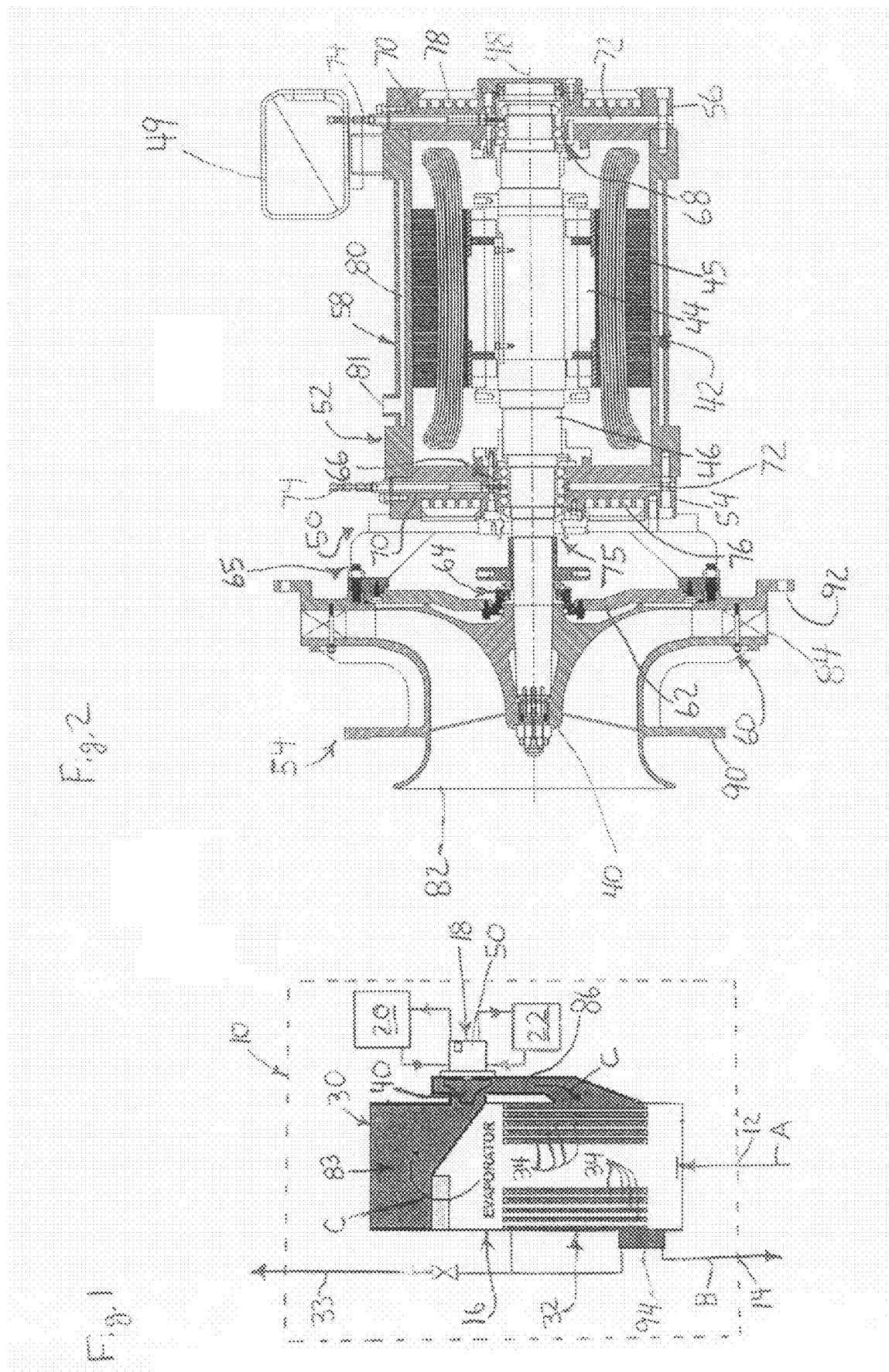

VAPOR COMPRESSION DISTILLATION SYSTEM INCLUDING AN INTEGRATED MOTOR/COMPRESSOR UNIT

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to distillation processing equipment, and more specifically, to vapor compression distillation systems.

BACKGROUND OF THE INVENTION

Vapor compression distillation systems are known and are typically used for the desalination of sea water and for the production of pharmaceutical grade waters in accordance with U.S. Pharmacopeia and equivalent foreign standards. Examples of such systems are shown and explained in U.S. Pat. No. 5,587,054 issued Dec. 23, 1996 and titled "Vapor Compression Distillation System" and U.S. Pat. No. 6,365,005 issued Apr. 2, 2002 and titled "Apparatus and Method For Vapor Compression Distillation".

It is common for such vapor compression distillation systems to utilize high speed centrifugal compressors that are driven by a standard electric motor via a suitable belt or gear transmission mounted between the motor and the compressor to step-up the speed from the motor to the appropriate rotational speed for the centrifugal compressor. The high speed centrifugal compressors can provide a suitably high outlet pressure while maintaining the compressor wheel at a small enough size to allow for the compressor to be integrally mounted to the evaporator/heat exchanger of this system in order to minimize external duct work.

In some larger vapor compression distillation systems, a direct driven motor and compressor arrangement has been used that doesn't require a belt or gear transmission to provide a step-up in speed. However, the limited rotational speed of the standard motors, typically in the range of 1,450 rpm to 3,500 rpm, requires a substantially larger compressor wheel in order to develop the required pressure at the lower operating speed of the directly driven compressor wheel. In such systems, the size of the compressor wheel and its associated housing assembly prevents integration with the evaporator/heat exchanger of the system and, accordingly, duct work must be provided between the evaporator/heat exchanger for the intake and discharge fluid streams to and from the compressor.

While the above systems may be suitable for their intended purpose there is always room for improvement.

SUMMARY OF THE INVENTION

In accordance with one feature of the inventions, a vapor compression distillation system is provided and includes a fluid inlet for receiving a fluid that is to be distilled; a fluid outlet for a distillate from the fluid; a heat exchanger connected to the fluid inlet and the fluid outlet to transfer heat from the distillate to the fluid; and an integrated motor/compressor unit connected to the heat exchanger to receive vaporized distillate therefrom and to supply pressurized distillate thereto. The integrated motor/compressor unit includes a compressor wheel and an electric motor having a rotor directly coupled to the compressor wheel to rotate the compressor wheel at the same speed as the rotor. The heat exchanger includes a housing and a core surrounded by the housing, with the core connected to the fluid inlet and the fluid outlet to transfer heat from the distillate to the fluid. The compressor wheel extends into the housing of the heat exchanger to receive the vaporized distillate from the core and deliver the pressurized distillate to the core.

As one feature, the electric motor is configured to drive the rotor and the compressor at operating speeds greater than 4,500 RPM.

According to one feature, the vapor compression distillation system further includes a coolant system connected to the integrated motor/compressor to supply a coolant flow thereto, and wherein the integrated motor/compressor further includes a housing assembly connected to the coolant system to receive the coolant flow therefrom.

In one feature, the housing assembly surrounds at least the electric motor and includes coolant flow passages arranged between the rotor and the compressor wheel to direct the coolant flow in heat transfer relation with the rotor and the compressor wheel.

As one feature, the housing assembly further includes additional coolant flow passages arranged adjacent an end of the rotor opposite from compressor wheel to direct the coolant flow in heat transfer relation with the rotor.

According to one feature, the integrated motor/compressor unit further includes bearings carried in the housing assembly to rotationally mount the rotor and the compressor wheel, the bearings located adjacent the coolant flow passages to transfer heat to the coolant flow.

In one feature, the housing assembly further includes a coolant jacket surrounding a stator of the electric motor to direct the coolant flow in heat transfer relation with the stator.

As one feature, the vapor compression distillation system further includes a air oil mist system connected to the housing assembly to direct an air oil mist to the bearings.

According to one feature, the integrated motor/compressor unit further includes a rotatable shaft, the shaft carrying both the rotor and the compressor wheel.

In a further feature, the integrated motor/compressor unit further includes a pair of bearings mounting the shaft for rotation and located between the compressor wheel and the rotor.

As one feature, the core includes a plurality of heat exchange tubes, with interiors of the tubes connected to one of the fluid inlet to receive the fluid therefrom and the compressor to receive the pressurized distillate therefrom, and exteriors of the tubes connected to the other of the fluid inlet to receive the fluid therefrom and the compressor to receive the pressurized distillate therefrom.

In accordance with one feature of the invention, a vapor compression distillation system includes a fluid inlet for receiving a fluid that is to be distilled; a fluid outlet for a distillate from the fluid; a heat exchanger connected to the fluid inlet and the fluid outlet to transfer heat from the distillate to the fluid; and an integrated motor/compressor unit connected to the heat exchanger to receive vaporized distillate therefrom and to supply pressurized distillate thereto. The integrated motor/compressor unit includes a compressor wheel, an electric motor including a rotor, and a rotatable shaft carrying both the rotor and the compressor wheel, with the electric motor being configured to drive the rotor and the compressor at operating speeds greater than 4,500 RPM.

As one feature, the heat exchanger includes a housing surrounding a plurality of heat exchange tubes, with interiors of the tubes connected to one of the fluid inlet to receive the fluid therefrom and the compressor to receive the pressurized distillate therefrom, and exteriors of the tubes connected to the other of the fluid inlet to receive the fluid therefrom and the compressor to receive the pressurized distillate therefrom. The compressor wheel extends into the housing of the heat exchanger to receive the vaporized distillate from the heat exchange tubes and deliver the pressurized distillate to the heat exchange tubes.

Other objects, features, and advantages of the invention will become apparent from a review of the entire specification, including the appended claims and drawings.

BRIEF DESCRIPTION OF THE DRAWINGS

FIG. 1 is a diagrammatic representation of a vapor compression distillation system embodying the present invention; and FIG. 2 is a somewhat diagrammatic cross-sectional representation of an integrated motor/compressor unit of the vapor compression distillation system of FIG. 1.

DETAILED DESCRIPTION OF THE PREFERRED EMBODIMENTS

As shown in FIG. 1, a vapor compression distillation system 10 includes a fluid inlet 12 for receiving a fluid (typically water), shown generally by arrows "A", that is to be distilled; a fluid outlet 14 for a distillate (typically distilled water), shown generally by arrows "B", that has been distilled from the fluid; a heat exchanger 16 connected to the fluid inlet 12 and the fluid outlet 14 to transfer heat from the distillate to the fluid; and an integrated motor/compressor unit 18 connected to the heat exchanger 16 to receive vaporized distillate therefrom and to supply pressurized distillate thereto.

In some preferred embodiments, the system 10 further includes a coolant system, shown generally at 20, connected to the integrated motor/compressor 18 to supply a coolant flow thereto. The coolant system 20 can either be a non-recirculating system that draws coolant, such as water, from a suitable source, or a recirculating system that recirculates the coolant through a radiator to reject the heat from the coolant. The system 10 may also include an air oil mist system, shown generally at 22, that is connected to the integrated motor/compressor unit 18 to supply an air oil mist thereto for bearing lubrication and cooling.

Other types of subsystems and/or components may be included in the system 10 as dictated by the specific requirements and parameters associated with each particular application in which the system 10 is utilized. Examples of such components and/or subsystems include deaerators, steam/water separators, decarbonators, heaters for preheating the fluid flow to the heat exchanger 16, coolers for cooling the distillate from the heat exchanger 16, additional vents and/or outlets for releasing non-condensable gases and/or other impurities from the system 10, and suitable pumps and/or blowers for directing the desired fluid flows through the various subsystems and components of the system 10. Because there are many such subsystems and components that are known and which could be used in the system 10 if required, and further because the specific details of these components are not critical to the invention, no further description will be provided herein.

The heat exchanger 16 includes a housing, shown generally at 30, and a core, shown generally at 32, surrounded by the housing 30 and having a low pressure side for the fluid from the inlet 12 and a high pressure side for the pressurized distillate from the integrated motor/compressor unit 18. The heat exchanger preferably operates as an evaporator on the low pressure side to evaporate the fluid, and as a condenser on the high pressure side to condense the pressurized distillate. Preferably, the high pressure side includes a vent 33 for allowing non-condensable gases to exit the system 10. It should be appreciated that the housing 30 and core 32 can be provided in many suitable forms as dictated by the requirements of each particular application.

In the illustrated embodiment, which is one preferred form, the core 32 includes an array of elongate, heat exchange tubes 34 that extend parallel to each other. As illustrated, the interiors of the tubes 34 define the low pressure side of the core 32 and are connected to the fluid inlet 12 to receive the fluid therefrom, and the exteriors of the tubes 34 define the high pressure side of the core 32 and are connected to the fluid outlet to deliver the distillate thereto. It should be understood that in some applications, it may be desirable for the arrangement to be switched so that the interiors of the tubes 34 are connected to the fluid outlet 14 to deliver distillate thereto and the exteriors of the tubes 34 are connected to the fluid inlet 12 to receive the fluid therefrom. Furthermore, it should be understood that while the tubes 34 are shown extending in a vertical direction, in some applications it may be desirable for the tubes 34 to extend horizontally, or in some other orientation. Additionally, it should be appreciated that while the tubes 34 are shown as having elongate type constructions that are arranged to extend parallel to each other, other configurations may be desirable in some applications, including configurations wherein the tubes 34 are coiled into a helical or spiral or some other configuration, with the coil potentially having only a single one of the tube 34. Furthermore, as another example, the tubes 34 could be provided as a stack of plates that form alternating flow paths for the fluid and the distillate. In short, while a preferred construction has been shown, it should be understood that there are many possible constructions for the housing 30 and the core 32.

As best seen in FIG. 2, the integrated motor compressor unit 18 includes a compressor wheel 40 and an electric motor 42 having a rotor 44 and a stator 45, with the rotor 44 being directly coupled to the compressor wheel 40 to rotate the compressor wheel 40 at the same speed as the rotor 44. In this regard, it is preferred that the integrated motor/compressor unit 18 include a rotatable shaft 46 that carries both the rotor 44 and the compressor wheel 40 for rotation about an axis 48, with the shaft 46 preferably being a unitary piece. It is highly preferred that the motor 42 be a so-called "high speed" electric motor, which are known, that is capable of driving the rotor 44 and the compressor wheel 40 at operating speeds of 4500 RPM and greater, with some embodiments having operating speeds up to 25,000 RPM. In some embodiments the optimum operating speed will be greater than 10,000 rpm, and in other embodiments the optimum operating speed will be greater than 18,000 rpm, with one optimum operating speed being 22,000 RPM. This compares to standard motors which typically are limited to operating speeds of less than 4,500 rpm. The high rotational speed of the motor 42 allows for the compressor wheel 40 to provide the distillate at a suitable pressure for the vapor compression distillation process, while maintaining the compressor wheel 40 at a small enough size to allow for the integrated motor/compressor unit 18 to be mounted directly to the housing 30 of the heat exchanger 16 with the compressor wheel 40 extending into the housing 30 to receive the vaporized distillate from the low pressure side of the core 32 and deliver the pressurized distillate to the core 32 to the high pressure side of the core 32, as shown by arrows "C" in FIG. 1.

It is also preferred that the motor 42 use a suitable variable frequency drive, shown diagrammatically at 49, such as is known for electric motors, to allow the rotational speed of the rotor 44 and the compressor wheel 40 to be varied. This allows for a variable output of the distillate that is directly proportional to the rotational speed or the compressor wheel 40.

The integrated motor/compressor unit 18 further includes a housing assembly 50 having a first subassembly 52 that surrounds the motor 42 and a second subassembly 54 that surrounds the compressor wheel 40. The subassembly 52 includes a pair of end plates 54 and 56 located on opposite sides of the rotor 44 and the stator 45, and a jacket housing 58 that extends between the plates 54 and 56 and surrounds the stator 45 and the rotor 44. The second subassembly 54 includes an inlet/outlet housing 60 that surrounds the compressor wheel 40, a seal plate 62 that carries a stationary component of a suitable high pressure rotating seal 64 for the compressor wheel 30, and a collar housing 65 that connects the subassembly 54 to the subassembly 52.

Bearings 66 and 68 are carried in the end plates 54 and 56, respectively, to rotationally mount the compressor wheel 40 and the rotor 44 via the shaft 46. In the illustrated embodiment, the bearing 68 is shown in the form of a ball bearing capable of transferring radial loads and axial loads in the direction of the plate 56, and the bearing 66 is provided in the form of a pair of ball bearings, each capable of transmitting radial loads and axial loads in the direction of the plate 54. Preferably, each of the plates 54 and 56 include at least one oil supply passage 70 to supply lubricating oil, preferably in the form of an air oil mist from the system 22 and at least one oil drain passage 72 for draining lubricating oil from the bearings 66 and 68. An air oil misting insert 74 may be provided in each of the passages 70. Preferably, the stationary component of another rotating seal 75 is carried in the plate 54 to retain lubricating oil within the subassembly 52.

It should be appreciated that while ball bearings are shown, other types of bearings may be employed for the bearings 66 and 68, including lubricated journal bearings, or a magnetic bearing system which could potentially eliminate any need for lubrication. Along similar lines, a grease lubricated system could be provided for the bearings 66 and 68 to replace the air oil mist lubrication of the bearings 66 and 68.

Preferably, a plurality of circumferentially extending, annular coolant flow passages 76 are provided in the plate 54 between the compressor wheel 40 and the rotor 44 to direct coolant flow from the cooling system 20 in heat exchange relation with both the electric motor 42 and the compressor wheel 40. Similar coolant flow passages 78 are provided in the plate 56 to direct the coolant flow from the coolant system 20 in heat exchange relation with the opposite end of the electric motor 42. An annular coolant jacket 80 is also preferably provided in the jacket housing 58 to direct coolant flow from the coolant system 20 around the stator 45 in heat exchange relation therewith. The coolant flow can be provided via coolant inlet/outlet ports, such as the port 81, to each of the flow passages 76, 78 and the jacket 80. These inlet/outlet ports can extend either radially or axially, as required.

Preferably, the housing 60 includes a compressor inlet 82 that receives vaporized distillate from a vapor plenum 83 in the housing 30 that collects vaporized distillate from the core 32, and a radially outwardly opening compressor outlet 84 for directing pressurized distillate from the compressor wheel 40 back to the core 32. In this regard, it is preferred that the housing 30 of the heat exchanger 16 include a plenum/duct 86 for directing the pressurized distillate flow from the compressor wheel 40 to the core 32, with the housing 60 preferably having a flange 90 that mates with a wall of the housing 30 to prevent or restrict bypassing of the pressurized distillate back into the vapor plenum 83. A flange 92 is also provided on the housing 60 to engage an opposite wall of the housing 30 to prevent or restrict leakage of the pressurized distillate from the housing 30.

In operation, the fluid is provided from the inlet 12 to the core 32 where heat transfer from the pressurized distillate provided from the compressor wheel 40 evaporates the fluid, which is then drawn into the compressor inlet 82 to be pressurized by the compressor wheel 40 and directed back to the core 32 via the outlet 84 and plenum/duct 86. The pressurized distillate is then condensed by the transfer of heat to the fluid and collected in a distillate plenum 94 of the housing 30 and then directed to the outlet 14.

It should be appreciated that by directly coupling a high speed electric motor 42 to the compressor wheel 40, the compressor wheel 40 can be sized to allow mounting of the integrated motor/compressor unit 18 with the compressor wheel 40 extending into the housing 30 of the heat exchanger 16 while still providing the distillate at a suitable pressure to the core 32. It should further be appreciated that by providing the cooling passages 76, 78 and jacket 80, the heat can be rejected from the compressor wheel 40 and the electric motor 42 at a rate sufficient to allow for continuous operation of the integrated motor/compressor unit 18.

The invention claimed is:

1. A vapor compression distillation system comprising:
a fluid inlet for receiving a fluid that is to be distilled;
a fluid outlet for a distillate from the fluid;
a heat exchanger comprising a housing and a core surrounded by the housing, the core connected to the fluid inlet and the fluid outlet to transfer heat from the distillate to the fluid; and
an integrated motor/compressor unit connected to the heat exchanger to receive vaporized distillate therefrom and to supply pressurized distillate thereto, the integrated motor/compressor unit comprising a compressor wheel and an electric motor including a rotor directly coupled to the compressor wheel to rotate the compressor wheel at the same speed as the rotor, the compressor wheel extending into the housing of the heat exchanger to receive the vaporized distillate from the core and deliver the pressurized distillate to the core.

2. The vapor compression distillation system of claim 1, wherein the electric motor is configured to drive the rotor and the compressor at operating speeds greater than 4,500 RPM.

3. The vapor compression distillation system of claim 1 further comprising a coolant system connected to the integrated motor/compressor to supply a coolant flow thereto, and wherein the integrated motor/compressor further comprises a housing assembly connected to the coolant system to receive the coolant flow therefrom.

4. The vapor compression distillation system of claim 3 wherein the housing assembly surrounds at least the electric motor and comprises coolant flow passages arranged between the rotor and the compressor wheel to direct the coolant flow in heat transfer relation with the rotor and the compressor wheel.

5. The vapor compression distillation system of claim 4 wherein the housing assembly further comprises additional coolant flow passages arranged adjacent an end of the rotor opposite from compressor wheel to direct the coolant flow in heat transfer relation with the rotor.

6. The vapor compression distillation system of claim 5 wherein the integrated motor/compressor unit further comprising bearings carried in the housing assembly to rotationally mount the rotor and the compressor wheel, the bearings located adjacent the coolant flow passages to transfer heat to the coolant flow.

7. The vapor compression distillation system of claim 6 wherein the housing assembly further comprises a coolant jacket surrounding a stator of the electric motor to direct the coolant flow in heat transfer relation with the stator.

8. The vapor compression distillation system of claim 6 further comprising an air oil mist system connected to the housing assembly to direct an air oil mist to the bearings.

9. The vapor compression distillation system of claim 1 wherein the integrated motor/compressor unit further comprises a rotatable shaft, the shaft carrying both the rotor and the compressor wheel.

10. The vapor compression distillation system of claim 9 wherein the integrated motor/compressor unit further comprises a pair of bearings mounting the shaft for rotation and located between the compressor wheel and the rotor.

11. The vapor compression system of claim 1 wherein the core comprises a plurality of heat exchange tubes surrounded by the housing, interiors of the tubes connected to one of the fluid inlet to receive the fluid therefrom and the compressor to receive the pressurized distillate therefrom, exteriors of the tubes connected to the other of the fluid inlet to receive the fluid therefrom and the compressor to receive the pressurized distillate therefrom.

12. A vapor compression distillation system comprising:
a fluid inlet for receiving a fluid that is to be distilled;
a fluid outlet for a distillate from the fluid;
a heat exchanger connected to the fluid inlet and the fluid outlet to transfer heat from the distillate to the fluid; and
an integrated motor/compressor unit connected to the heat exchanger to receive vaporized distillate therefrom and to supply pressurized distillate thereto, the integrated motor/compressor unit comprising a compressor wheel, an electric motor including a rotor, and a rotatable shaft carrying both the rotor and the compressor wheel, the electric motor configured to drive the rotor and the compressor at operating speeds greater than 4,500 RPM.

13. The vapor compression distillation system of claim 12 further comprising a coolant system connected to the integrated motor/compressor to supply a coolant flow thereto, and wherein the integrated motor/compressor further comprises a housing assembly connected to the coolant system to receive the coolant flow therefrom.

14. The vapor compression distillation system of claim 13 wherein the housing assembly surrounds at least the electric motor and comprises coolant flow passages arranged between the rotor and the compressor wheel to direct the coolant flow in heat transfer relation with the rotor and the compressor wheel.

15. The vapor compression distillation system of claim 14 wherein the housing assembly further comprises additional coolant flow passages arranged adjacent an end of the rotor opposite from compressor wheel to direct the coolant flow in heat transfer.

16. The vapor compression distillation system of claim 15 wherein the integrated motor/compressor unit further comprising bearings carried in the housing assembly to rotationally mount the rotor and the compressor wheel, the bearings located adjacent the coolant flow passages to transfer heat to the coolant flow.

17. The vapor compression distillation system of claim 13 wherein the housing assembly further comprises a coolant jacket surrounding a stator of the electric motor to direct the coolant flow in heat transfer relation with the stator.

18. The vapor compression distillation system of claim 13 further comprising an air oil mist system connected to the housing assembly to direct an air oil mist to the bearings.

19. The vapor compression distillation system of claim 12 wherein the integrated motor/compressor unit comprise a pair of bearings mounting the shaft for rotation and located between the compressor wheel and the rotor.

20. The vapor compression system of claim 12 wherein:
the heat exchanger comprises a housing surrounding a plurality of heat exchange tubes, interiors of the tubes connected to one of the fluid inlet to receive the fluid therefrom and the compressor to receive the pressurized distillate therefrom, exteriors of the tubes connected to the other of the fluid inlet to receive the fluid therefrom and the compressor to receive the pressurized distillate therefrom; and
the compressor wheel extends into the housing of the heat exchanger to receive the vaporized distillate from the heat exchange tubes and deliver the pressurized distillate to the heat exchange tubes.

* * * * *